(12) United States Patent
Spence

(10) Patent No.: US 10,805,877 B2
(45) Date of Patent: Oct. 13, 2020

(54) LOCATION BASED CONNECTIONS

(71) Applicant: McLaren Applied Technologies Limited, Surrey (GB)

(72) Inventor: Paul Spence, Guildford (GB)

(73) Assignee: McLaren Applied Technologies Limited, Surrey (GB)

( * ) Notice: Subject to any disclaimer, the term of this patent is extended or adjusted under 35 U.S.C. 154(b) by 0 days.

(21) Appl. No.: 15/308,154

(22) PCT Filed: Mar. 31, 2015

(86) PCT No.: PCT/EP2015/057112
§ 371 (c)(1),
(2) Date: Nov. 1, 2016

(87) PCT Pub. No.: WO2015/165682
PCT Pub. Date: Nov. 5, 2015

(65) Prior Publication Data
US 2017/0055206 A1    Feb. 23, 2017

(30) Foreign Application Priority Data

May 2, 2014  (GB) .................................. 1407867.9

(51) Int. Cl.
*H04W 48/20* (2009.01)
*H04W 4/40* (2018.01)
(Continued)

(52) U.S. Cl.
CPC .......... *H04W 48/20* (2013.01); *H04B 17/318* (2015.01); *H04W 4/40* (2018.02);
(Continued)

(58) Field of Classification Search
CPC . H04W 28/0268; H04W 48/04; H04W 48/20; H04W 4/046; H04W 64/006; H04W 88/02; H04W 88/08; H04B 17/318
See application file for complete search history.

(56) References Cited

U.S. PATENT DOCUMENTS 5,920,607 A * 7/1999 Berg ...................... H04B 17/18
370/241
2003/0118015 A1* 6/2003 Gunnarsson .......... H04W 48/16
370/389
(Continued)

FOREIGN PATENT DOCUMENTS

| EP | 1401229 | 3/2004 |
|----|---------|--------|
| GB | 2484115 | 4/2012 |
| WO | 2013091342 | 6/2013 |

OTHER PUBLICATIONS

International Search Report and Written Opinion for International Application No. PCT/EP2015/057112, dated Jul. 20, 2015; 8 pages.
(Continued)

*Primary Examiner* — Erica Navar
(74) *Attorney, Agent, or Firm* — Fish & Richardson P.C.

(57) ABSTRACT

A mobile device comprising: a first transceiver configured to communicate with a plurality of base stations; a positioning unit configured to provide location information of the mobile device; the mobile device being configured to store connection criteria associated with a first base station of the plurality of base stations; and the mobile device being configured to, based on a location of the mobile device and the connection criteria, select the first base station of the plurality of base stations to communicate with, and initiate a connection with the first base station.

20 Claims, 4 Drawing Sheets

(51) Int. Cl.
*H04W 48/04* (2009.01)
*H04W 64/00* (2009.01)
*H04B 17/318* (2015.01)
*H04W 28/02* (2009.01)
*H04W 4/42* (2018.01)
*H04W 88/02* (2009.01)
*H04W 88/08* (2009.01)

(52) U.S. Cl.
CPC ....... *H04W 28/0268* (2013.01); *H04W 48/04* (2013.01); *H04W 64/006* (2013.01); *H04W 4/42* (2018.02); *H04W 88/02* (2013.01); *H04W 88/08* (2013.01)

(56) References Cited

U.S. PATENT DOCUMENTS

| | | | | |
|---|---|---|---|---|
| 2004/0058678 | A1* | 3/2004 | deTorbal | H04W 36/32 455/437 |
| 2004/0106379 | A1* | 6/2004 | Zen | H04W 48/20 455/67.11 |
| 2007/0026866 | A1 | 2/2007 | Krishnamurthi | |
| 2009/0103503 | A1 | 4/2009 | Chhabra | |
| 2009/0191892 | A1* | 7/2009 | Kelley | H04W 48/20 455/456.1 |
| 2009/0239549 | A1 | 9/2009 | Grigsby et al. | |
| 2013/0225173 | A1 | 8/2013 | Lim et al. | |
| 2014/0141784 | A1* | 5/2014 | Schmidt | H04W 36/32 455/437 |

OTHER PUBLICATIONS

UK Search Report for Application No. GB1407867.9, dated Oct. 21, 2014; 5 pages.
European examination report for corresponding Appl No. 15713486.7, dated Nov. 26, 2018.
European Examination Report in EP Appln. No. 15713486.7, dated Jun. 16, 2020, 5 pages.

* cited by examiner

LOCATION BASED CONNECTIONS

This application is a national stage of and claims priority under 35 U.S.C. § 371 to PCT Application No. PCT/EP2015/057112, filed on Mar. 31, 2015, which claims priority to British Application No. GB1407867.9, filed on May 2, 2014. The contents of both of these priority applications are hereby incorporated by reference in their entirety.

This invention relates to a mobile device that can select a base station to communicate with based on the location of the mobile device. In one example, the mobile device is located on a vehicle.

Mobile devices can typically be used to connect to the internet to access services provided by remote servers. These connections to remote servers can make use of wireless connections for the part of the connection from the mobile device to a base station. This enables the mobile device to move without being encumbered by a wired connection that limits the mobile ability of the mobile device. The onward connection from the base station may be made using a wired or wireless link.

As the mobile device moves position from one location to another, the mobile device will move from the coverage range of at least one base station to others. When this occurs the mobile device will need to connect to a new base station and disconnect from the old base station so that the mobile device can continue to communicate with remote servers. A standard method of a mobile device ascertaining whether it is leaving the coverage area of one base station is to monitor the signal strength of communications with that base station. At a basic level, a reduction in signal strength is used by the mobile device to indicate that it is reaching the edge of the coverage range of a base station.

One situation of where such a mobile device may be used to connect to remote servers is in a vehicle. When a vehicle such as a car, bus or train is carrying passengers, the passengers might possess communication devices and might desire to connect their devices to the internet. For example, the passengers may desire access to an email server to check whether they have any new email or access to a web server to download web pages. Passenger carrying vehicles can have apparatus for connecting to remote servers and for sharing this connection with passengers' own devices. The vehicle's apparatus for connecting to remote servers could itself be similar to the mobile device described above. The vehicle's apparatus could comprise a mobile router that moves with the vehicle and that can establish a data connection with a wayside base station external to the vehicle and share that data connection with the host devices on the vehicle.

The vehicle's mobile router can connect to at least one antenna on the vehicle for connecting to wayside base stations. These base stations may be cellular base stations provided by cellular network operators or other wireless base stations such as Wi-Fi base stations. The router may also be connected to a wired or wireless network internal to the vehicle which passengers' devices can use to connect to the internet via the router. The router may be comprised of more than one part to provide these connections, for example it may be a cellular modem, a wireless access point and a packet router connected together.

As the vehicle moves along its path of travel, the vehicle's mobile router will move out of the communication range of certain wayside base stations and in to the communication range of other wayside base stations. The vehicle may travel fast, through less densely populated areas and/or through areas that have obstructions. In such environments, the ability of the vehicle's mobile router to reliably transition a connection from one wayside base station to another can be impaired. This is because changes in the signal strength of the connection between the vehicle's mobile router and the base station may occur over a very short time frame which means that the vehicle's mobile router does not have time to initiate a replacement connection with a new base station before the connection to another base station has been lost. For example, an obstruction may suddenly block communication with a base station that up until that point had very good signal strength.

Therefore, there is a need for an improved mobile device that is better equipped to select a suitable base station to communicate with at a particular time.

According to a first aspect of the present invention there is provided a mobile device comprising: a first transceiver configured to communicate with a plurality of base stations; a positioning unit configured to provide location information of the mobile device; the mobile device being configured to store connection criteria associated with a first base station of the plurality of base stations; and the mobile device being configured to, based on a location of the mobile device and the connection criteria, select the first base station of the plurality of base stations to communicate with, and initiate a connection with the first base station.

The mobile device may be configured to, based on the location of the mobile device and connection criteria, terminate a connection with a second base station of the plurality of base stations. The mobile device may be configured to terminate a connection with a second base station of the plurality of base stations once the connection with the first base station has been established.

The mobile device may be configured to terminate a connection with a second base station of the plurality of base stations before the connection with the first base station has been established. The mobile device may be configured to initiate the connection with the first base station independently of the signal strength of transmissions received at the mobile device from the second base station.

The mobile device may be configured to terminate the connection with the second base station independently of the signal strength of transmissions received at the mobile device from the second base station. The mobile device may be configured to initiate the connection with the first base station independently of the signal strength of transmissions received at the mobile device from the first base station.

The mobile device may be configured to terminate the connection with the second base station independently of the signal strength of transmissions received at the mobile device from the first base station. The connection criteria may comprise a first connection initiation zone. The mobile device may be configured to select, in response to the location information of the mobile device indicating that the mobile device has moved into the first connection initiation zone, the first base station of the plurality of base stations to communicate with and initiate a connection with the first base station.

The mobile device may comprise a second transceiver configured to communicate with a plurality of base stations, wherein the connection criteria may comprise a first connection initiation zone and a second connection initiation zone, and the mobile device may be configured to: select, in response to the location information of the mobile device indicating that the mobile device has moved into the first connection initiation zone, the first base station of the plurality of base stations to communicate with, and initiate a connection with the first base station using the first transceiver; and select, in response to the location information of the mobile device indicating that the mobile device has moved into the second connection initiation zone, the first base station of the plurality of base stations to communicate with, and initiate a connection with the first base station using the second transceiver.

The mobile device may comprise a first antenna connected to the first transceiver, and a second antenna connected to the second transceiver, wherein the mobile device may be located on a vehicle and the first antenna and second antenna are spaced apart on the vehicle along the direction of travel of the vehicle. The mobile device may comprise a second transceiver configured to communicate with a plurality of base stations, a first antenna connected to the first transceiver, and a second antenna connected to the second transceiver, wherein the connection criteria may comprise a first connection initiation zone, and the mobile device may be configured to: derive location information for the first antenna from the location information of the mobile device and derive location information for the second antenna from the location information of the mobile device; select, in response to the location information of the first antenna indicating that the first antenna has moved into the first connection initiation zone, the first base station of the plurality of base stations to communicate with, and initiate a connection with the first base station using the first transceiver; and select, in response to the location information of the second antenna indicating that the second antenna has moved into the first connection initiation zone, the first base station of the plurality of base stations to communicate with, and initiate a connection with the first base station using the second transceiver.

The first antenna and the second antenna may be located at opposite ends of the vehicle. A known transit path of the mobile device may intersect the connection initiation zones.

The mobile device may be configured to receive updated connection initiation zones for at least one of the plurality of base stations from a control station. The mobile device may be configured to log communication quality associated with the connection to each base station. The mobile device may be configured to transmit the log of communication quality to a control station, and receive updated connection initiation zones for at least one of the plurality of base stations from the control station. The mobile device may be configured to update the connection initiation zones in dependence on the log of communication quality.

The positioning unit may be configured to receive RF location signals and derive the location information of the mobile device from location data contained in those location signals. The positioning unit may be connected to an RF receiver for the reception of location signals, and the positioning unit may be configured to derive the location information of the mobile device from location data contained in those location signals.

The positioning unit may be configured to receive location data comprising the distance travelled by the mobile device, the known travel path of the mobile device and starting position of the mobile device, and derive the location information of the mobile device from the location data. The mobile device may be located on a vehicle, and the positioning unit may be configured to receive location data comprising the running distance of the vehicle from a known location, and the travel path of the vehicle.

The positioning unit may be configured to receive location data concerning a received signal strength of the base stations and derive the location information of the mobile device from the received signal strength of the base stations.

The positioning unit may be configured to derive the location information of the mobile device from the received signal strength of the base stations by determining the presence of artefacts in the received signal strength and comparing those artefacts to a map of received signal strength variation.

The connection criteria may comprise a first connection initiation zone and a second connection initiation zone, and the mobile device may be configured to: select, in response to the location information of the mobile device indicating that the mobile device has moved into the first connection initiation zone, the first base station of the plurality of base stations to communicate with, and initiate a connection with the first base station using the first transceiver using a first communication mode; and select, in response to the location information of the mobile device indicating that the mobile device has moved into the second connection initiation zone, the first base station of the plurality of base stations to communicate with, and initiate a connection with the first base station using the first transceiver using a second communication mode.

The first communication mode and the second communication mode may each comprise a different modulation type. The first communication mode and the second communication mode may each comprise a power level for the connection from the mobile device to the base station.

According to a second aspect of the present invention there is provided a vehicle comprising a mobile device according to the description provided herein, the position of the mobile device being fixed relative to the vehicle. The mobile device may be connected to an on-vehicle network to permit communication between the on-vehicle network and the base stations. The vehicle may be a train.

According to a third aspect of the present invention there is provided a network of vehicles, the network comprising: a first vehicle, and at least one other vehicle; wherein each vehicle may comprise a wireless transceiver and the wireless transceivers of the other vehicles may be capable of communicating with the wireless transceiver of the first vehicle. The first vehicle may comprise a first mobile device and at least one other vehicle may comprise a second mobile device according to the description provided herein; and the second mobile device may be configured to: store second connection criteria associated with connecting to another mobile device; and based on the location of the second mobile device and the second connection criteria, select the first mobile device to communication with, and initiate a connection with the first mobile device.

According to a fourth aspect of the present invention there is provided a mobile device comprising: a first transceiver configured to communicate with a plurality of other mobile devices; a positioning unit configured to provide location information of the mobile device; the mobile device being configured to store connection criteria associated with connecting to another mobile device; and the mobile device being configured to, based on a location of the mobile device and the connection criteria, select another mobile device of the plurality of mobile devices to communicate with, and initiate a connection with the another mobile device.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a mobile device that can select when to connect to a particular base station by making use of position information collected by the mobile device. The mobile device is provided with a positioning unit that can derive position information from position data received from a variety of sources. The mobile device selects when to connect to a particular base station by using the location of the mobile device and pre-stored connection criteria. The connection criteria can include a connection initiation zone which defines a geographical zone and the mobile device can be configured to initiate a connection to a particular base station when the mobile device enters that zone.

Figure 1:
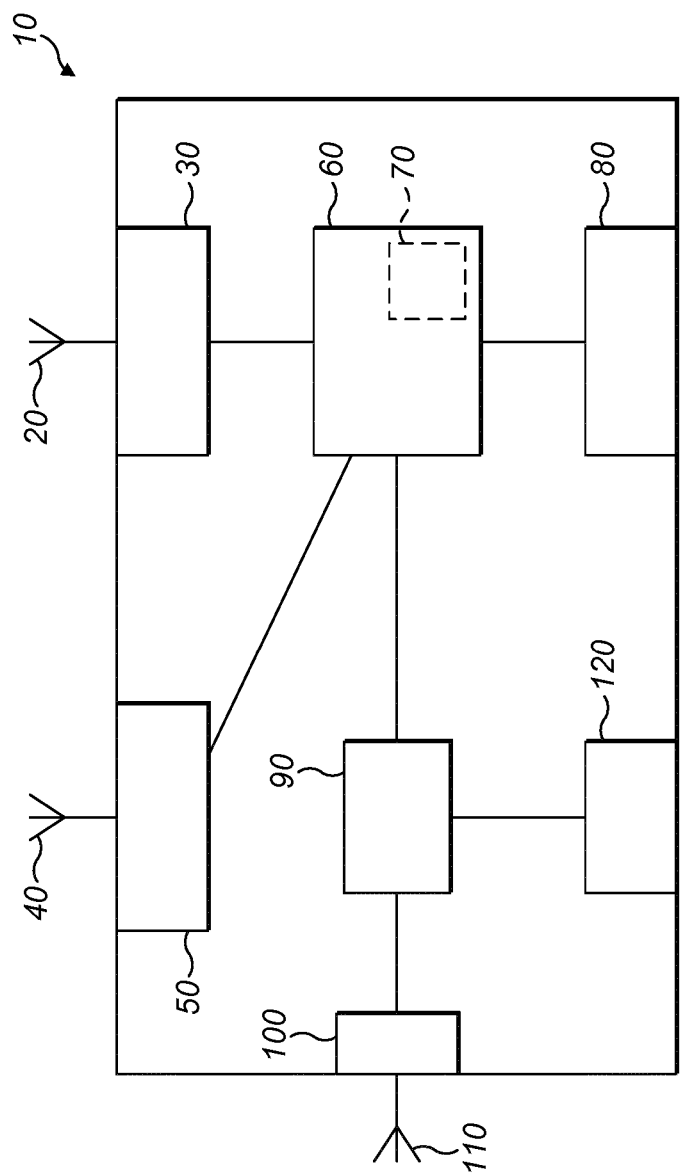
FIG. 1 shows a schematic diagram of a mobile device.

FIG. 1 shows a schematic diagram of an example mobile device in accordance with the present invention. In FIG. 1, the mobile device 10 has a first antenna 20 connected to a first transceiver 30. The mobile device 10 can use the first transceiver 30 to communicate with at least one of a plurality of base stations at any one time. In communicating with the base station, the mobile device 10 can establish a data connection to ground-based equipment using the first transceiver 30 and first antenna 20.

The mobile device 10 may also be equipped with at least a second antenna 40 connected to a second transceiver 50. The mobile device can use the second transceiver 50 to communicate with either the same or different one of a plurality of base stations at one time. This second antenna 40 and transceiver 50 can be used to independently establish a data connection to ground-based equipment. The mobile device may include more than two antennas and transceivers depending on the number of individual connections to ground-based equipment that it is desired for the mobile station 10 to make.

It will be appreciated that whilst FIG. 1 may give the impression that first and second antennas 20, 40 and transceivers 30, 50 as being located physically close together, the two antennas and transceivers could be physically separated by a substantial distance. For example, in the case of the mobile device being used on a vehicle as described above, the antennas could be positioned at opposite ends of the vehicle.

The radio transceivers 30, 50 can include: (a) one or more transceivers each of which can independently establish a data connection with one of a number of wayside base stations next to the movement path of the mobile device 10; and (b) one or more cellular transceivers which need not be next to the movement path of the mobile device 10. The wayside base stations could be dedicated for use by vehicles travelling along the movement path of the mobile device. The wayside wireless base stations may operate according to a wireless technology such as Wi-Fi. The cellular base stations could be publically accessible for cellular telephony. The cellular base stations could communicate according to a 3G or 4G standard. In the case of a 4G base station these could operate according to, for example, LTE, WiMAX or HSPA+ standards.

The mobile device 10 can be provided with a processor 60 that is capable of executing a set of program instructions that are stored in memory 70. The processor 60 may be configured to operate in accordance with a computer program, which could include that set of program instructions, stored in non-transitory form on a machine readable storage medium. The instructions can cause the computer program to operate the mobile device as described herein.

Memory 70 can be a non-volatile memory. Memory 70 may be part of processor 60 or connected to processor 60 via a bus. Memory 70 can also store reference data such as look-up tables that can be referenced by the processor 60 in response to the instructions stored in memory 70. The memory 70 is also capable of storing data that is required for the function of the mobile device 10, for example parameters and criteria that are needed in the decision making processes of the mobile device 10.

Processor 60 is connected to the first transceiver 30 to send and receive data via first antenna 20. The processor 60 can also be connected to at least second transceiver 50 to send and receive data via at least second antenna 40 when such transceivers and antennas are present in the mobile device 10.

As discussed above, transceivers 30, 50 communicate with base stations. Each base station is able to be separately identified by data received by the transceivers. The mobile device 10 is therefore able to identify each base station that it is communicating with at a given time. The identification of the base station can be derived from identity data including:

an identity code for the base station,
the transmission frequency of the base station,
the MAC address of the base station.

For example, in the case of a cellular base station, a base station identity code may be transmitted by each base station. This base station identity code may be sufficient to identify the base station. However, the transmission frequency of the base station may also be required if the base station identity code is reused by different base stations on different frequencies. In the case of a wireless base in the form of a Wi-Fi base station, the MAC address of the base station may be sufficient for the mobile device 10 to identify the base station.

This base station identity data can be used by the processor 60 to instruct the transceivers 30, 50 to connect to a particular base station at any given moment in time.

The mobile device 10 is provided with a data interface 80. This data interface 80 can be connected to processor 60. This data interface 80 can be used by the mobile device 10 to send and receive data. The data that is sent and received via data interface 80 may be communicated via first and second transceivers 30, 50 to a base station that the mobile device 10 is connected to.

In the example of a vehicle described above, the data interface 80 may be connected to equipment that can function as a wireless access point to accept connections from end-user devices or other host devices located on the vehicle. The data interface 80 may be connected to equipment that can provide a wired network connection. The data interface 80 could be connected to one or both of a wired and wireless network local to the vehicle. Such a network can be used to also accept connections from end-user devices or other host devices. In a more general case, the data interface 80 may be connected to a network that permits connections from end-user devices to the mobile device 10.

The mobile device 10 is also equipped with a positioning unit 90. This positioning unit can be connected to processor 60. The positioning unit 90 is capable of deriving location information concerning the position of the mobile device 10. The positioning unit 90 can receive location data from numerous sources which the positioning unit 90 can use to derive the location information concerning the position of the mobile device 10. Exemplary ways in which the positioning unit 90 can receive location data and derive location information are described below.

The positioning unit 90 may be connected to a RF receiver 100. The RF receiver is connected to a positioning antenna 110 for the reception of location signals. These location signals can be processed by the positioning unit 90 to produce location data. This location data can be used to derive location information concerning the position of the mobile device 10. This location information can be provided to processor 60.

The location signals received by positioning receiver 100 can be in the form of signals sent from positioning satellites. The positioning receiver 100 can receive location signals from multiple satellites, these signals may be processed to produce location data which can be used by positioning receiver 100 to derive location information concerning the position of the mobile device 10. For example, the positioning receiver 100 may be capable of receiving GPS signals. It will be readily apparent that the positioning unit may be adapted to receive signals from any satellite positioning system, for example GLONASS or Galileo.

The positioning unit 90 can also receive location data via location interface 120. Location interface 120 could be used by the positioning unit 90 to receive data concerning the signal strength of the base stations that the transceivers 30, 50 of the mobile device 10 are connected to. The data concerning the signal strength of the base stations can be used in a variety of ways by the positioning unit 90. The data concerning the signal strength may be used to enhance the accuracy of the location information derived from location data received in other ways. For example, the location information derived using the positioning receiver 100 may be combined with the location information derived using the signal strength. The data concerning the signal strength can also be used to derive the position of the mobile device 10 when the mobile device is located at particular positions.

The signal strengths of the base stations can be used by positioning unit 90 to triangulate the position of mobile device 10 and so derive location information concerning the position of the mobile device 10.

Signals received from the base stations may contain artefacts that are indicative of the position of the mobile device 10. For example, there may be a dip in the received signal strength when the mobile device 10 passes through a particular location. Alternatively there may be a temporary increase in the received signal strength when the mobile device 10 passes through a particular location. The variation in the received signal strength of the base stations in dependence on the position of the mobile device 10 can be stored as a map of received signal strength variation. This map can be used by the positioning unit 90 to derive location information based on the location data, which in this case, can be the variation of received signal strength as the mobile device 10 moves. Again, the correlation of measured signal strength to such characteristic variations in local signal strength can be augmented with information received from other sources such as satellite positioning systems and distance of travel as indicated by mechanical motion of the vehicle's running gear.

In a particular example, the mobile device 10 may be in a location, such as a tunnel, where signals cannot be received from positioning satellites, but can still communicate with base stations that direct their signal along the tunnel. In this example, the mobile device 10 can use positioning unit 90 to derive location information from the received signal strength of the base stations during the period when it cannot receive signals from positioning satellites.

Location interface 120 could be used by the positioning unit 90 to receive data concerning the distance that mobile device 10 has travelled since leaving a starting point with a known destination. In the case that the mobile device 10 travels along a known path then the positioning unit 90 will be able to take the location data, in the form of the distance travelled, starting position and travel path, and derive the current position of the mobile device 10. Thus, the positioning unit 90 can derive location information concerning the position of the mobile device 10 using the location data that includes a starting position, travel path and distance travelled. The distance travelled may be derived from the speed and time travelled by the mobile device 10. The positioning unit 90 may store the travel path and starting position and then receive information of the distance travelled as the mobile device 10 moves.

The travel path may be a fixed travel path that is known prior to the mobile device 10 starting to move from the starting position. For instance, in the example case that the mobile device 10 is located on a vehicle as described above, the vehicle can travel along a known path. If the vehicle is a vehicle that is physically constrained to run on a fixed geographical path, e.g. a train running on a railway track, then the train will travel along a track from a known departure location (i.e. a station) to a known destination (i.e. another station). The path that the railway track takes will be known and so the travel path of the train along the track will be known. The distance travelled can be derived from the number of revolutions of the wheels of the vehicle if the circumference of the wheel is known. Information concerning the number of revolutions of the wheels can be provided as location data over location interface 120 to the positioning unit 90. This method of generating location information could equally be applied to a coach or bus following a known route, or a car travelling along a predetermined path.

The travel path may be calculated as the mobile device 10 moves. For instance, the location information derived by positioning unit 90 by other ways, such as from the positioning signals received from positioning satellites, could be used to calculate the travel path. The location information derived using the distance that the mobile device 10 has travelled could be derived by without using the positioning satellites and then used to improve the accuracy of the location information derived using the positioning satellites. In the example case that the mobile device 10 is located on a vehicle as described above, the distance travelled can be derived from the number of revolutions of the wheels of the vehicle.

It will be readily apparent that whilst the positioning unit 90 has been described separately to the processor 60, the functions of the positioning unit 90 could be performed by the processor 60. In such a case, the processor 60 will be connected to the positioning receiver 100 and location interface 120. Location interface 120 has been described separately to the data interface 80. It will be readily apparent that data interface 80 could be adapted to receive the location data for the mobile device 10. In this case the data interface 80 could also function as the location interface 120 and the location data could either be received directly by the positioning unit 90 or sent to the positioning unit 90 by processor 60.

It will be readily apparent that the mobile device 10 may be formed of a number of separate components that are connected together for data communication between them. For instance, each transceiver 30, 50 could be incorporated in to a separate cellular modem device that is connected to a mobile router that incorporates processor 60 and memory 70 together with data interface 80.

The data connections that mobile device 10 establishes with base stations during the movement of mobile device 10 is explained below with reference to FIGS. 2 and 3. FIG. 3 shows a plan view of the schematic diagram shown in FIG. 2. Like numerals indicate like parts.

Figure 2:
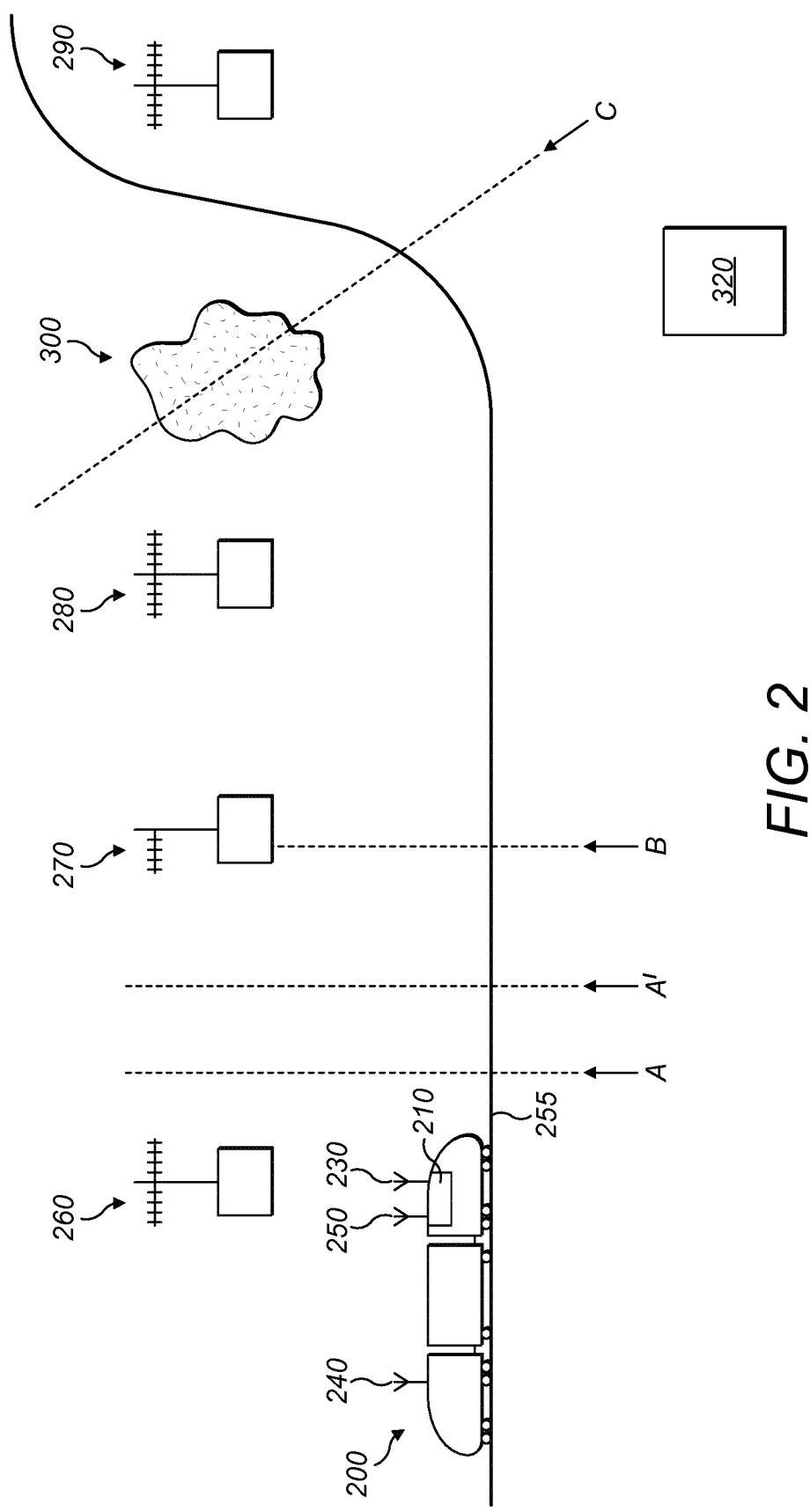
FIG. 2 shows a schematic diagram of a mobile device moving along a known transit path.
Figure 3:
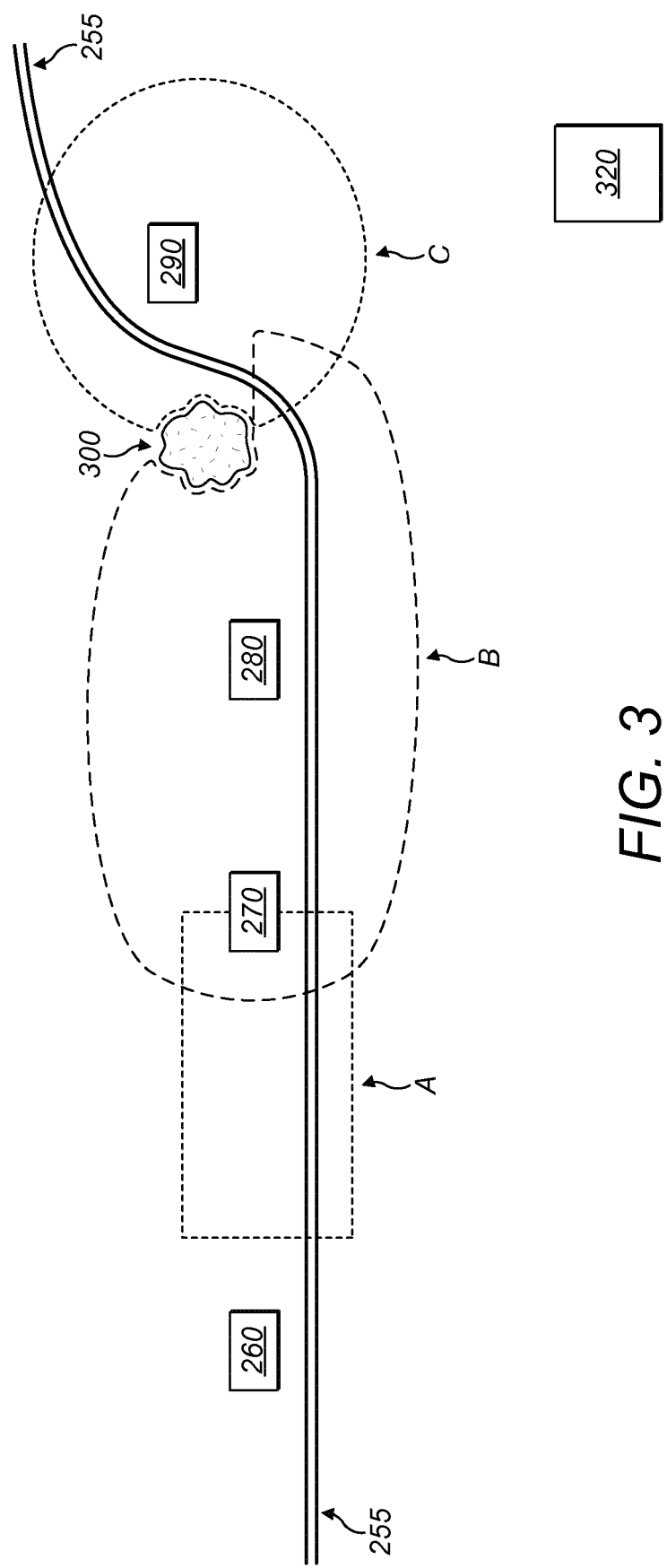
FIG. 3 shows a plan view of the schematic diagram shown in FIG. 2.

FIG. 2 shows a vehicle 200. A mobile device 210 is located on vehicle 200. This mobile device 210 may be as previously described. In this example, mobile device 210 is mobile in the sense that, although its position is fixed relative to the vehicle 200, the mobile device 210 moves when the vehicle 200 moves. Also shown in FIG. 2 is that the vehicle 200 has a first antenna 230 and a second antenna 240 for connection to transceivers as described above, and a positioning antenna 250 for connection to a positioning receiver as is also described above. The first antenna 230 can be located at one end of the vehicle 200 and the second antenna 240 can be located at the other end of the vehicle 200.

As will be apparent from the preceding discussion, whilst two antennas are shown in FIG. 2, only one antenna, or more than two antennas, for connection to base stations, may be provided with accompanying transceivers. As will also be readily apparent from the preceding discussion, the positioning antenna 250 may not be required, for example if positioning information is received by some other means.

The vehicle 200 shown in FIG. 2 could be a train. The vehicle 200 can travel along a known path 255 as shown in FIG. 2 as an unbroken line. In the case of a train this known path 255 will be a track. In the case of a bus or coach this known path 255 will be a transit route along roads, such as a bus route. As discussed above, known path 255 may be calculated as the vehicle 200 moves along. A plurality of base stations 260, 270, 280, 290 are positioned along the path 255.

The radio transceivers of mobile device 210 can include: (a) one or more transceivers each of which can independently establish a data connection with one of a number of wayside base station 260, 270, 280, 290 next to the railway track; and (b) one or more cellular transceivers each of which can independently establish a data connection with one of a number of cellular base stations 260, 270, 280, 290 of telephone operators. The base stations 260, 270, 280, 290 are connected to respective network connections to allow communication with servers located on the internet and/or in remote networks.

Therefore, these base stations 260, 270, 280, 290 may each be one of (a) a cellular base station 260, 270, 280, 290 of a telephone operator; and (b) a wayside wireless base station that can communicate according to another wireless technology such as Wi-Fi. The cellular base stations could communicate according to a 3G or 4G standard. In the case of a 4G base station these could operate according to, for example, LTE, WiMAX or HSPA+ standards. The cellular base station(s) could have a longer operational range than the wayside base station(s).

There may also be obstructions 300 along the known path 255. Such an obstruction 300 can strongly attenuate or cause deviation of radio signals and so impair and/or inhibit the propagation of radio waves emanating from the base stations 260, 270, 280, 290. Such an obstruction will cause localised low signal strength areas in the overall coverage area of a base station.

The base stations 260, 270, 280, 290 are positioned along known path 255. In order of distance from the starting position of the vehicle as shown in FIG. 2, these base stations are a first base station 260, second base station 270, third base station 280 and fourth base station 290.

First base station 260 transmits and receives broadly uniformly in all directions. Second base station 270 has a directional antenna pointing towards the starting position of the vehicle 200 as shown in FIG. 2. Therefore, second base station 270 will transmit and receive only in the direction towards first base station 260 and not in a direction away from first base station 260. Third and fourth base stations 280, 290 transmit and receive broadly uniformly in all directions. However, an obstruction 300 is present between third and fourth base stations 280, 290 meaning that the coverage areas of third and fourth base stations 280, 290 will be affected by the obstruction 300. For example, either of the third and fourth base stations 280, 290 may not be able to communicate with a mobile device 210 when the obstruction 300 is located along the line-of-sight path between an antenna of mobile device 210 and the third or fourth base station 280, 290.

The logic for selection of a base station 260, 270, 280, 290 to communicate with at a given point on the known path 255 by the mobile device 210 based on the position of mobile device 210 will now be explained with reference to the base stations and obstruction shown in FIG. 2. Also, explained below is the selection of the communication mode by the mobile device 210 for the connection with a base station 260, 270, 280, 290.

The vehicle 200 is shown in FIG. 2 at a starting point located along known path 255 in the coverage range of first base station 260. The starting point of vehicle 200 is illustrative and the vehicle 200 may have already travelled a distance to reach this starting point. As the vehicle 200 is within the coverage range of first base station 260 the mobile device 210 located on vehicle 200 will use at least one of first and second antennas 230, 240 to communicate with first base station 260 to establish and maintain a data connection between the mobile device 210 and the first base station 260. The establishment of the connection to first base station 260 may have been made using the base station selection method described herein.

The vehicle 200, and so mobile device 210, will move along known path 255 towards second base station 270. The position of the mobile device 210, and so vehicle 200, will be monitored by the positioning unit 90 of the mobile device 210. The methods in which that position can be derived by positioning unit 90 are discussed above.

The mobile device 210 stores at least one connection initiation zone associated with second base station 270. As shown in FIGS. 2 and 3, the known transit path 255 intersects the connection initiation zone associated with second base station 270. The connection initiation zone may be an area, regular or irregular shaped, surrounding or neighbouring the second base station. The connection initiation zone could be two or three dimensional, or could be one-dimensional. A one-dimensional zone would be satisfactory in the case of a vehicle that is constrained to run on a pre-defined path. The second base station connection initiation zone is labelled as A in FIG. 3 and is shown as A in FIG. 2 at the point that vehicle 200 will move into the connection initiation zone associated with second base station.

When the positioning unit 90 indicates that mobile device 210 has moved into the second base station connection initiation zone, the mobile device 210 will attempt to initiate a data connection to second base station 270 using an antenna 230 connected to a transceiver. This initiation of a data connection to second base station 270 can use an identifier for the second base station stored on and/or available to mobile device 210. A data connection to second base station 270 will therefore be established by mobile device 210 once the vehicle 200, and so mobile device 210, has moved into the second base station connection zone (A). The connection initiation zone can be selected to give the best transition from first base station to second base station. The connection initiation zone can be calculated in advance of the mobile device 210 reaching the region in which a transition needs to be made from the first base station 260 to the second base station 270. The connection to second base station 270 can therefore be made independently of any signal strength measurements that may be made by the mobile device 210. Alternatively, the connection to second base station 270 can be made without directly using any signal strength measurements that may be made by the mobile device 210.

The mobile device 210 can also use the connection initiation zone for deciding when to terminate the data connection to the first base station 260. This can either be (a) directly related to the connection initiation zone in that the mobile device 210 terminates the connection to the first base station 260 when, or at a predetermined distance after, the mobile device 210 moves into the connection initiation zone; or (b) indirectly related to the connection initiation zone in that the mobile device 210 terminates the data connection to first base station 260 after the data connection to the second base station 270 has been successfully established. The mobile device 210 may terminate the connection to first base station 260 prior to establishing the connection to second base station 270. This may occur if the mobile device 210 can connect to one base station at a time using a particular transceiver.

As the vehicle 200 may be travelling fast, the reduction in the signal strength from communications received from first base station may happen too suddenly for mobile device 210 to be able to detect this drop and initiate the connection to the second base station 270 before the connection to the first base station has been lost. This may mean a gap in a useable data connection for mobile device 210. The use of a connection initiation zone associated with the second base station means that the initiation of the connection to second base station can occur before this drop occurs and thus avoid the potential gap in a useable data connection.

The mobile device 210 can therefore use the location of the mobile device 210 together with at least one connection criterion for the connection to second base station 270. In this case the connection criteria is a first connection initiation zone associated with the second base station.

The mobile device 210 may store more than one connection initiation zone associated with a particular base station. In FIG. 2, the vehicle 200, and so mobile device 210, is shown as having a first and a second antenna 230, 240 connected to separate transceivers for data communication with base stations. This means that two separate connections can be made from the mobile device 210 to base stations. In the example of the transition from the first base station 260 to the second base station 270, when the vehicle 200 is in a position before the vehicle reaches position A both the first and second antennas 230, 240 could be being used by mobile device 210 for separate data connections with first base station 260.

When the positioning unit 90 indicates that vehicle 200 has reached position A, which is when mobile device 210 moves into a first connection initiation zone associated with second base station, the mobile device 210 can attempt to initiate a data connection to second base station 270 using first antenna 230 connected to a transceiver. First antenna 230 is the antenna located closest to the second base station 270. In the case that the vehicle 210 is a long vehicle such as a train, first antenna 230 and second antenna 240 can be located at opposite ends of the vehicle. This means that there will be a significant difference in the distance between each of the antennas and the base station 210.

The process of initiating of a data connection to second base station 270 can make use of an identifier for the second base station stored on or available to mobile device 210. A data connection to second base station 270 will therefore be established by mobile device 210 using first antenna 230 once the vehicle 200, and so mobile device 210, has moved into the first connection initiation zone (A) associated with the second base station.

A second connection initiation zone (A') can also be associated with the second base station 270.

When the positioning unit 90 indicates that vehicle 210 has moved in to the second connection initiation zone A', which is a second connection initiation zone associated with second base station, the mobile device 210 can attempt to initiate a data connection to second base station 270 using second antenna 230 connected to a transceiver. Second antenna 230 is the antenna located farthest from the second base station 270. A different connection initiation zone is used for the second antenna 230 so that a smooth transition from first base station 260 to second base station 270 can be achieved. This allows the mobile device 210 time to establish the data connection with second base station 270 before terminating the data connection with first base station 260. More bandwidth for the connection from mobile device 210 to remote servers can also be attained by using data connections to separate base stations. This is because each base station may have a separate onward network connection and so the mobile device 210 can make use of both of these network connections. Therefore, it can be advantageous to keep a connection to first base station after a point at which the signal strength of the connection with first base station would indicate that the connection should be switched to the second base station. The first and second connection initiation zones can be selected to benefit from this. Alternatively the mobile device can make a determination to stagger the initiating of the connections to different base stations.

The mobile device 210 can therefore use the location of the mobile device 210 together with at least two connection criteria for the connection to second base station 270. These connection criteria can include a first connection initiation zone for the establishment of a data connection using a first transceiver to the second base station; and a second connection initiation zone for the establishment of a data connection using a second transceiver to the second base station.

The mobile device 210 may know the position of the antennas relative to the position of the positioning unit 90. The mobile device 210 may be configured to store a distance of each antenna relative to the position of the rest of the mobile device 210. The mobile device 210 can therefore derive the position of each antenna using the location information calculated by the positioning unit 90. The mobile device 210 could therefore select and initiate the connections to the base stations based on the position of the antennas rather than the position of the mobile device 210 itself.

The mobile device 210 may use a different connection initiation zone for a particular base station depending on the time of year. Therefore, another connection criteria used by the mobile device 210 can be the day, month, season or period during the year. The mobile device may use different connection initiation zones in dependence on the current time, for example the time of day or the period during the year. For example, there may be some obstructions, trees for instance, that are only present during the spring and summer months that are not present during the autumn and winter months. The mobile device 210 can stay attached to a particular base station for a longer distance because a particular obstruction is not present. Alternatively, the mobile device 210 could switch to another base station sooner because an additional obstruction is present due to the time of year. The date could be derived from the location information received by the positioning unit 90.

Another potential advantage of the present invention can be seen when directional antennas are used by at least one base station. As discussed above, second base station 270 has a directional antenna pointing towards the starting position of the vehicle 200 as shown in FIG. 2. Therefore, second base station 270 will transmit and receive only in the direction towards first base station 260 and not in a direction away from first base station 260 and towards third base station 280. The coverage area of second base station 270 will therefore have an abrupt edge at the region of transition from the direction that the antenna is pointing and the opposite direction. Therefore, when the mobile device 210 is travelling towards second base station 270 there will be a position at which the data connection with second base station 270 will be suddenly lost. The first connection initiation zone (B) associated with third base station 280 will therefore be chosen to allow the mobile device time to establish a data connection with third base station 280 before the data connection to second base station 270 is lost. In this situation, the signal strength of communications with second base station 270 will be very good until the moment that the connection is lost due to the directional antenna used by the second base station 270. Therefore, the use of signal strength as an indicator of when to switch from one base station to another would cause a period when the data connection from mobile device 210 would be dropped. This can be avoided by the use of the connection initiation zone.

Similar to the directional antenna example given above, the present invention can also give advantage when an obstruction is present in the coverage area of a base station. As discussed above, at least one obstruction 300 may be present along the known transit path 255. The obstruction 300 may be located within the coverage areas of third base station 280 and fourth base station 290. This obstruction 300 causes areas of low signal strength in the coverage areas of both the third base station 280 and the fourth base station 290. Therefore, when the mobile device 210 is travelling towards fourth base station 290 there will be a position at which the data connection with third base station 280 will be suddenly lost as the obstruction breaks the line-of-slight between the antenna of the third base station 280 and at least one of the antennas of the mobile device 210. The first connection initiation zone (C) associated with fourth base station 290 will therefore be chosen to allow the mobile device time to establish a data connection with fourth base station 290 before the data connection to third base station 280 is lost. In this situation, the signal strength of communications with third base station 280 will be very good until the moment that the connection is lost due to the presence of obstruction 300. Therefore, the use of signal strength as an indicator of when to switch from one base station to another would cause a period when the data connection from mobile device 210 would be dropped. Again, this can be avoided by the use of the connection initiation zone.

The connection initiation zones associated with a particular base station may be altered or selected in response to a number of factors. As discussed above, different connection initiation zones may be used at different times of the day or year.

The connection initiation zones associated with a particular base station may be altered when there are multiple vehicles 200 present in a particular area. In this case, a control station 320 could send instructions to the mobile device 210 on the vehicle 200 to update the connection initiation zones associated with the base stations as stored on and used by that vehicle. Connection initiation zones could be updated for one vehicle independently of the others. The mobile device 210 may be configured to receive updated connection initiation zones associated with a base station from a control station 320. The updated connection initiation zones associated with a base station may be configured to select a particular network configuration. The mobile devices 210 then connecting to the base stations with the updated connection initiation zones will connect to each of the base stations in a particular manner that is consistent with that network configuration.

The network configuration may be such that each mobile device 210 selects the best base station to communicate with at any given time. For instance, the connection initiation zones for each base station may be configured to cause the mobile device 210 to connect to each base station in turn at a point to maximise signal strength and/or quality between the mobile device 210 and the base stations. This configuration may limit the bandwidth available to the mobile devices 210 because the mobile devices 210 may cluster in their connections to particular base stations which offer the best signal strength at any given point.

The network configuration may be such that each mobile device 210 selects the base stations to which it will connect in such a way that the connections from multiple such mobile devices are distributed over the network of base stations. This may mean that a particular mobile device 210 may be connected to a base station that provides a less optimal connection for it than would another base station within the connection range of that mobile device 210. However, because the connections from mobile devices 210 are spread out over the network of base stations there may be more bandwidth available overall for all of the connections due to the mobile devices 210 as a whole making use of more base stations. In this configuration, the updated connection initiation zones received by the mobile device 210 can be configured to cause the mobile device 210 to connect to the base station having high bandwidth as the mobile device 210 moves along travel path 255.

The network configuration may be such that each mobile device 210 selects the base stations that means that the mobile device connections use the lowest cost connections to base stations. This may mean that a particular mobile device 210 ignores an available connection to a particular base station because the cost associated with communicating via that base station is too high. There may therefore be no connection initiation zones associated with that high cost base station or the connection initiation zones may be small so that the high cost base station is only used as a last resort. In this configuration, the updated connection initiation zones received by the mobile device 210 are configured to cause the mobile device 210 to prioritise connections to low cost connection base stations.

The control station 320 may update the connection initiation zone periodically to update the network configuration as required.

One situation where the control station 320 may update the connection initiation zones is if the mobile device 210 senses that there is a change in the configuration of the connections to the base stations. The mobile device 210 may be configured to log the communication quality with each of the base stations. The mobile device 210 may be configured to update the connection initiation zones in dependence on the log of communication quality. Alternatively, the mobile device 210 may be configured to transmit the log of communication quality to a control station 320. The control station 320 may be configured to update the connection initiation zones in dependence on the log of communication quality and then send the updated connection initiation zones to the mobile device 210.

The log of communication quality may be used to detect that there has been a failure in one or more of the base stations and therefore remove the connection initiation zones associated with those one or more base stations. The log of communication quality may be used to detect that an obstruction has been introduced or removed and so the connection initiation positions associated with a particular base station near the obstruction need to be updated.

The methods described above could also be used to alter the communication mode of the connection between a mobile device 210 and a base station 260, 270, 280, 290. The communication mode may include the modulation of the connection between a mobile device 210 and a base station 260, 270, 280, 290. The communication mode may include the power level of the connection between a mobile device 210 and a base station 260, 270, 280, 290. The may be connection initiation zones associated with the mobile device 210 connecting to a particular base station in a particular communication mode. Therefore, there may be more than one connection initiation zone associated with a particular base station with each connection initiation zone having a particular set of communication mode parameters associated with that connection initiation zone. The communication mode parameters comprising a modulation type and power level.

Figure 4:
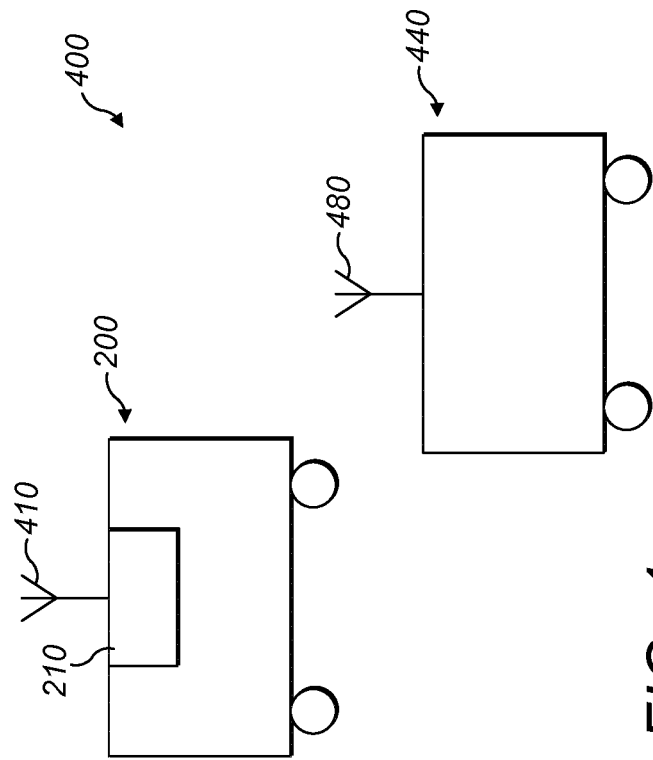
FIG. 4 shows a schematic diagram of a group of vehicles operating in a network.

FIG. 4 shows a group of vehicles 400 that are capable of operating together in a network. At least one vehicle 200 comprises a mobile device 210 according to the preceding discussions. The vehicle 200, that comprises a mobile device 210, may be capable of communicating with other vehicles 420, 440. This group of vehicles 400 may be capable of forming a network to enable communication between said group of vehicles 400. Each vehicle 200, 420, 440 may comprise a wireless transceiver 410, 460, 480 that is configured to communicate with the wireless transceiver 410, 460, 480 of the other vehicles.

The vehicle 200 that comprises the mobile device 210 may be capable of communicating with each of the other vehicles 420, 440 in the group of vehicles using the wireless transceivers 410, 460, 480. Each vehicle 200, 420, 440 may comprise a mobile device according to the preceding discussion. The vehicles 200, 420, 440 that comprise a mobile device 210 may be capable of connecting to remote servers via that mobile device 210. These vehicles 200 may be capable of forwarding data from the other vehicles 420, 440 received via the wireless transceivers to those remote servers via that mobile device 210. The wireless transceivers 410, 460, 480 for communication with the other vehicles may be part of the mobile device 210. The wireless transceivers 410, 460, 480 may be the wireless transceivers included in the mobile device 210 for communication with base stations. The use of a mobile device 210 within the group of vehicles 400 may advantageously provide the benefits of the use of such a mobile device 210 to more than one vehicle when those vehicles travel together.

In the case where more than one vehicle 200, 420, 440 comprises a mobile device according to the preceding discussion, the mobile device of each vehicle may be configured to determine, based on the location of the mobile device, whether to connect to a base station or connect to another one of the vehicles that has established a connection to a base station. The mobile device can use the connection criteria as described above for the purpose of determining whether to connect to another mobile device. For instance, the mobile device can store at least one connection initiation zone associated with attempting to connect, and/or connecting to another mobile device. The network of vehicles can thereby select the best mobile device to establish the connection to a base station at any given location, and the other mobile devices can establish a connection to remote servers via the mobile device that has established the connection to a base station.

An example situation where this may be advantageous is when a vehicle, for instance a train, is leaving a station. The base station(s) provided in the station can have a limited coverage area, however the bandwidth provided by those base stations may be high. Therefore, it may be advantageous to continue to use the base stations in the station for as long as possible. A vehicle leaving the coverage range of the station base stations may have a connection initiation zone defined so that the first mobile device contained in the vehicle is configured to seek a connection with another mobile device in the area around the coverage area of the base stations provided by the station. Another mobile device may be closer to the base stations provided by the station and still able to connect. The other mobile device can therefore be used to forward data on to the station base stations from the first mobile device. This example is not limited to base stations in a station, but could be used by a mobile device to enable the mobile device to continue to provide a connection to remote networks when there is no direct coverage from a base station.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A mobile device comprising:
a first transceiver configured to communicate with a plurality of base stations;

a positioning unit configured to provide location information of the mobile device;

the mobile device being configured to store connection criteria associated with a first base station of the plurality of base stations and a second base station of the plurality of base stations; and the mobile device being configured to, based on a location of the mobile device and the connection criteria, select the first base station of the plurality of base stations to communicate with, initiate a connection with the first base station independently of the signal strength of transmissions received at the mobile device from the first base station, and terminate a connection with a second base station of the plurality of base stations independently of the signal strength of transmissions received at the mobile device from the second base station, wherein the connection criteria include a first connection initiation zone for establishment of a data connection to the first base station, and a second connection initiation zone different from the first connection initiation zone for establishment of a data connection to the second base station, wherein the first connection initiation zone is different than an overall coverage area of the first base station and is shaped to account for a deviation in the overall coverage area of the first base station caused by one or more obstructions, wherein the mobile device is configured to select, in response to the location information of the mobile device indicating that the mobile device has moved into the first connection initiation zone, the first base station of the plurality of base stations to communicate with and initiate a connection with the first base station.

2. The mobile device according to claim 1, wherein the mobile device is configured to terminate a connection with a second base station of the plurality of base stations once the connection with the first base station has been established.

3. The mobile device according to claim 1, wherein the mobile device is configured to terminate a connection with a second base station of the plurality of base stations before the connection with the first base station has been established.

4. The mobile device according to claim 1, wherein the mobile device is configured to initiate the connection with the first base station independently of the signal strength of transmissions received at the mobile device from the second base station.

5. The mobile device according to claim 1, wherein the mobile device is configured to terminate the connection with the second base station independently of the signal strength of transmissions received at the mobile device from the first base station.

6. The mobile device according to claim 1, the mobile device comprising a second transceiver configured to communicate with the plurality of base stations, and the mobile device is configured to:

select, in response to the location information of the mobile device indicating that the mobile device has moved into the first connection initiation zone, the first base station of the plurality of base stations to communicate with, and initiate a connection with the first base station using the first transceiver; and select, in response to the location information of the mobile device indicating that the mobile device has moved into the second connection initiation zone, the first base station of the plurality of base stations to communicate with, and initiate a connection with the first base station using the second transceiver.

7. The mobile device according to claim 6, the mobile device comprising a first antenna connected to the first transceiver, and a second antenna connected to the second transceiver, wherein the mobile device is located on a vehicle and the first antenna and second antenna are spaced apart on the vehicle along a direction of travel of the vehicle.

8. The mobile device according to claim 1, the mobile device comprising a second transceiver configured to communicate with the plurality of base stations, a first antenna connected to the first transceiver, and a second antenna connected to the second transceiver, and the mobile device is configured to:

derive location information for the first antenna from the location information of the mobile device and derive location information for the second antenna from the location information of the mobile device;

select, in response to the location information of the first antenna indicating that the first antenna has moved into the first connection initiation zone, the first base station of the plurality of base stations to communicate with, and initiate a connection with the first base station using the first transceiver; and select, in response to the location information of the second antenna indicating that the second antenna has moved into the first connection initiation zone, the first base station of the plurality of base stations to communicate with, and initiate a connection with the first base station using the second transceiver.

9. The mobile device according to claim 7, wherein the first antenna and the second antenna are located at opposite ends of the vehicle.

10. The mobile device according to claim 1, wherein the mobile device is configured to receive updated connection initiation zones for at least one of the plurality of base stations from a control station.

11. The mobile device according to claim 1, wherein the mobile device is configured to log communication quality associated with the connection to each base station, and the mobile device is configured to either (i) transmit the log of communication quality to a control station, and receive updated connection initiation zones for at least one of the plurality of base stations from the control station or (ii) update the connection initiation zones in dependence on the log of communication quality.

12. The mobile device according to claim 1, wherein the mobile device is located on a vehicle, and the positioning unit is configured to receive location data comprising a running distance of the vehicle from a known location, and a travel path of the vehicle.

13. The mobile device according to claim 1, wherein the mobile device is configured to:

select, in response to the location information of the mobile device indicating that the mobile device has moved into the first connection initiation zone, the first base station of the plurality of base stations to communicate with, and initiate a connection with the first base station using the first transceiver using a first communication mode; and select, in response to the location information of the mobile device indicating that the mobile device has moved into the second connection initiation zone, the first base station of the plurality of base stations to communicate with, and initiate a connection with the first base station using the first transceiver using a second communication mode.

14. The mobile device according to claim 13, wherein the first communication mode and the second communication mode each comprise a different modulation type.

15. A first vehicle comprising a mobile device according to claim 1, the position of the mobile device being fixed relative to the first vehicle and the mobile device being connected to an on-vehicle network to permit communication between the on-vehicle network and the plurality of base stations.

16. A network of vehicles, the network comprising:
the first vehicle according to claim 15, and
at least one other vehicle;
wherein each vehicle comprises a wireless transceiver and wherein the wireless transceivers of the at least one other vehicle are capable of communicating with the wireless transceiver of the first vehicle;
wherein the mobile device of the first vehicle is a first mobile device and wherein the at least one other vehicle comprises a second mobile device comprising:
a first transceiver configured to communicate with the plurality of base stations;
a positioning unit configured to provide location information of the second mobile device;
the second mobile device being configured to store connection criteria associated with a first base station of the plurality of base stations, the second mobile device being configured to, based on a location of the second mobile device and the connection criteria, select the first base station of the plurality of base stations to communicate with, initiate a connection with the first base station independently of the signal strength of transmissions received at the second mobile device from the first base station, and terminate a connection with a second base station of the plurality of base stations independently of the signal strength of transmissions received at the second mobile device from the second base station; and
the second mobile device being configured to:
store second connection criteria associated with connecting to another mobile device; and
based on the location of the second mobile device and the second connection criteria, select the first mobile device to communicate with, and initiate a connection with the first mobile device.

17. The mobile device according to claim 1, wherein the first connection initiation zone is irregularly shaped, and the second connection initiation zone is irregularly shaped.

18. The mobile device according to claim 1, wherein the first connection initiation zone is altered depending on the time of day or year.

19. The mobile device according to claim 1, wherein the mobile device is configured to, based on a location of the mobile device and the connection criteria, select the second base station of the plurality of base stations to communicate with, and initiate a connection with the second base station independently of the signal strength of transmissions received at the mobile device from the second base station.

20. The mobile device according to claim 1, wherein the first connection initiation zone is irregularly and concave shaped, and the second connection initiation zone is irregularly and concave shaped.

* * * * *